US010407258B2

(12) United States Patent
Ai et al.

(10) Patent No.: US 10,407,258 B2
(45) Date of Patent: Sep. 10, 2019

(54) STOCKYARD JOINT RECLAIMING SYSTEM AND METHOD

(71) Applicant: CISDI ENGINEERING CO., LTD, Chongqing (CN)

(72) Inventors: Yu Ai, Chongqing (CN); Shanglun Chen, Chongqing (CN)

(73) Assignee: CISDI ENGINEERING CO., LTD, Chongqing (CN)

( * ) Notice: Subject to any disclaimer, the term of this patent is extended or adjusted under 35 U.S.C. 154(b) by 0 days.

(21) Appl. No.: 15/846,494

(22) Filed: Dec. 19, 2017

(65) Prior Publication Data

US 2018/0237234 A1    Aug. 23, 2018

(30) Foreign Application Priority Data

Feb. 22, 2017    (CN) .......................... 2017 1 0097229

(51) Int. Cl.
| | |
|---|---|
| *B65G 65/06* | (2006.01) |
| *B65G 19/04* | (2006.01) |
| *B65G 19/22* | (2006.01) |

(52) U.S. Cl.
CPC .............. *B65G 65/06* (2013.01); *B65G 19/04* (2013.01); *B65G 19/22* (2013.01);
(Continued)

(58) Field of Classification Search
CPC ........ B65G 65/06; B65G 19/04; B65G 19/22; B65G 2812/0295; B65G 2201/04;
(Continued)

(56) References Cited

U.S. PATENT DOCUMENTS

| | | | | |
|---|---|---|---|---|
| 4,026,423 A | * | 5/1977 | Schade .................. | B65G 65/06 198/508 |
| 4,248,337 A | * | 2/1981 | Zimmer ................. | B65G 65/06 198/507 |
| 2015/0120038 A1 | * | 4/2015 | Gralow ................ | G05D 1/0248 700/229 |

FOREIGN PATENT DOCUMENTS

| | | | | |
|---|---|---|---|---|
| CN | 205240475 U | * | 5/2016 | ............... B65G 3/04 |
| GB | 757260 | * | 9/1956 | ............. B65G 65/00 |
| WO | WO-2009069946 A2 | * | 6/2009 | ............... B65G 3/02 |

OTHER PUBLICATIONS

"Patent Translate CN 205240475" EPO and Google. (Year: 2018).*

* cited by examiner

*Primary Examiner* — Mark A Deuble
(74) *Attorney, Agent, or Firm* — Michael D. Eisenberg

(57) ABSTRACT

A stockyard joint reclaiming system includes an outer output conveyor, a scraper reclaimer provided with a scraper mechanism, an inner feeder, and an inner output conveyor arranged below a stockpile. The scraper mechanism includes a chain and a scraper installed on a chain. The chain moves forwards or backwards under the action of a driving device to drive the scraper to push materials to a corresponding discharging port. The scraper mechanism drives the scraper through forward or reverse operation of the chain for pushing the materials to the output conveyor and a reclaiming line can be selected. A reclaiming mode is flexible and more output lines are available. When the material level is lower than a horizontal position, the scraper is driven to move through a reverse operation of the chain to push the materials to an upper part of the inner feeder for realizing reclaiming, thereby reducing unnecessary energy consumption and effectively guaranteeing the reclaiming capability of the scraper reclaimer.

19 Claims, 6 Drawing Sheets

(52) U.S. Cl.
CPC .. *B65G 2201/04* (2013.01); *B65G 2812/0295* (2013.01); *B65G 2814/0334* (2013.01); *B65G 2814/0344* (2013.01)

(58) Field of Classification Search
CPC .... B65G 2814/0334; B65G 2814/0344; B65G 65/42; B65G 65/28
See application file for complete search history.

STOCKYARD JOINT RECLAIMING SYSTEM AND METHOD

CROSS-REFERENCE TO RELATED APPLICATIONS

This application claims the priority, under 35 U.S.C. §§ 119, 120, 172, 363, 365, and 371, of China patent application No. 201710097229.5, filed Feb. 22, 2017; the prior application is herewith incorporated by reference in its entirety.

STATEMENT REGARDING FEDERALLY SPONSORED RESEARCH OR DEVELOPMENT

Not Applicable

TECHNICAL FIELD

The present invention relates to the field of storage and conveying facilities of bulk material, and particularly relates to a stockyard joint reclaiming system and method.

BACKGROUND OF THE INVENTION

A scraper reclaimer is widely used in a reclaiming system of bulk material for simple structure, uniform reclaiming, reliable performance and other advantages. However, in the system of the prior art, the scraper reclaimer can only scrape the material in a single direction; output lines are limited; when the material level of the stored material is high, i.e., when the scraper mechanism is inclined upwards by a certain angle, reclaiming operation can be well made to the material under the action of a scraper; but when the material level of the stored material is low, i.e., when the scraper mechanism is inclined downwards by a certain angle, because a surface of the material has a certain height difference from a discharging port, the scraper needs to lift the material to a certain height to overcome own gravity of the material so as to complete the reclaiming operation, causing that driving power of the scraper reclaimer is obviously increased and the reclaiming capability of the scraper reclaimer is affected to a certain degree. In addition, in the existing bulk material blending technology, because a volume of a blending bin is limited, the bulk material needs to be stored in a primary stockyard firstly and then transferred to the blending bin for performing proportioning operation. The blending bin arranged separately not only makes a long technological process to cause impossibility of realizing integrated material storage and blending, but also increases a risk of material blockage. Therefore, improvement is necessary with respect to the above problems in the existing reclaiming system and method.

SUMMARY OF THE INVENTION

In view of the above defects in the prior art, the purpose of the present invention is to provide a stockyard joint reclaiming system and method to solve problems of single reclaiming mode and limited output line in the prior art.

To achieve the above purpose and other relevant purposes, the present invention adopts the following technical solution:

A stockyard joint reclaiming system comprises an outer output conveyor and a scraper reclaimer provided with a scraper mechanism. The stockyard joint reclaiming system also comprises an inner feeder and an inner output conveyor arranged below a stockpile. The scraper mechanism comprises a chain and a scraper installed on the chain. The chain moves forwards or backwards under the action of a driving device to drive the scraper to push materials to a corresponding discharging port.

Preferably, the inner feeder is lower than a lowest level of an operation range of the scraper mechanism of the scraper reclaimer in a vertical direction, and the inner output conveyor is located below the inner feeder.

Preferably, the inner feeder and the inner output conveyor are located outside the operation range of the scraper mechanism of the scraper reclaimer in a horizontal direction.

Preferably, the scraper reclaimer and the inner feeder are configured to move back and forth along a lengthwise direction of the stockyard, and a bottom surface of the stockyard is a bevel with a higher outer side and a lower inner side or the bottom surface of the stockyard is a plane.

Preferably, the stockyard joint reclaiming system also comprises a material storing and bearing bottom plate and a vertical retaining wall; the material storing and bearing bottom plate and the vertical retaining wall form a material storing cabinet; and the inner feeder and the inner output conveyor are located below an inner side of the stockpile, and are near the vertical retaining wall.

Preferably, the material storing cabinet is divided into a plurality of independent unit material cabinets by a horizontal partitioning wall arranged in the material storing cabinet. A plurality of independent unit material cabinets can store different kinds of materials, and can also realize independent storage of materials needing blending and materials needing not blending, for the convenience of reclaiming in different modes.

Preferably, the inner feeder is also provided with a weighing device.

The inner feeder with the weighing device is arranged to solve problems of unnecessary repeated transshipment and long process flow caused by limited volume of a blending bin in the existing material blending process, thereby reducing technological links, reducing production and operation cost and realizing integrated storage and blending.

Preferably, the scraper has a front scraper arranged forwards and a rear scraper arranged backwards to form a bidirectional scraping structure.

Preferably, the scraper comprises an installing plate and two groups of scraper components oppositely arranged on the installing plate; the scraper components comprise main plates and side plates connected on both ends of the main plates; and the side plates are obliquely arranged and form a "∟⌐"-shaped structure with the main plates.

Preferably, two main plates are connected and supported through a rib plate, and reinforced rib plates are arranged on the side plates.

Preferably, the scraper components also comprise bottom plates connected to bottom ends of the main plates and the side plates; rake teeth are also arranged on the main plates and the side plates; and the rake teeth extend from edges of the main plates and the side plates.

The present invention also provides a stockyard joint reclaiming method, adopting the stockyard joint reclaiming system and used for outputting stored materials, wherein the following reclaiming modes are selected according to the height of the material level or needs of technological production:

the materials are conveyed to the inner output conveyor under the action of own gravity through the operation of the inner feeder, and the inner feeder moves back and forth along the lengthwise direction of the stockyard to complete reclaiming in the lengthwise direction;

the scraper reclaimer located on the outer side is operated forwards through the chain of the scraper mechanism to drive the scraper to move for pushing the materials to the outer output conveyor, and the scraper reclaimer moves back and forth along the lengthwise direction of the stockyard to complete reclaiming in the lengthwise direction; and the scraper reclaimer located on the outer side is operated backwards through the chain of the scraper mechanism to drive the scraper to move for pushing the materials to the upper part of the inner feeder, the materials above the inner feeder are outputted to the inner output conveyor under the action of the gravity through the inner feeder, and the inner feeder moves back and forth along the lengthwise direction of the stockyard to complete reclaiming in the lengthwise direction. This reclaiming mode is especially suitable for a lower material level, i.e., the materials are in or below the horizontal position and the scraper mechanism of the scraper reclaimer needs to downwards incline by a certain angle to scrape the materials. The reclaiming mode solves problems of increase of power and large energy consumption because the scraper mechanism needs to downwards incline by a certain angle to lift the materials when the surfaces of the materials are lower than the discharging port.

The inner output conveyor or the outer output conveyor takes precedence, depending on actual conditions. For the material variety needing blending, the weighing device arranged on the inner feeder is mainly used for quantitative feeding and the inner output conveyor is used for delivering the material, thereby realizing quantitative feeding. A plurality of inner feeders can be arranged. For the material variety needing not blending, the material can be delivered through the outer output conveyor or through the inner output conveyor and the outer output conveyor jointly.

As mentioned above, the present invention has the following beneficial effects:

1. The scraper mechanism drives the scraper to move through forward or reverse operation of the chain for pushing the materials to the corresponding output conveyor; and a reclaiming line can be selected as required. A reclaiming mode is flexible, and more output lines are available.

2. When the material level is lower than a horizontal position, if the scraper mechanism needs to incline downwards by a certain angle, the scraper mechanism drives the scraper to move through the reverse operation of the chain to push the materials to an upper part of the inner feeder for realizing reclaiming, thereby avoiding idle work generated by lifting the materials in the prior art, reducing unnecessary energy consumption and effectively guaranteeing the reclaiming capability of the scraper reclaimer.

3. The problems of repeated material reshipment and long process flow caused by limited volume of a blending bin in the existing blending process, thereby reducing technological links, reducing production and operation cost and realizing integrated storage and blending.

DESCRIPTION OF PART MARKS

1—scraper reclaimer; 2—scraper mechanism; 3—bulk material; 4—inner feeder; 5—inner output conveyor; 6—outer output conveyor; 7—chain; 8—scraper; 9—vertical retaining wall; 10—material storing and bearing bottom plate; 11—material storing cabinet; 12—horizontal partitioning wall;

81—main plate; 82—side plate; 83—rib plate; 84—rake tooth; 85—bottom plate; 86—installing plate; 87—reinforced rib plate; and 88—connecting hole.

DETAILED DESCRIPTION OF THE EMBODIMENTS

Embodiments of the present invention are described below through specific embodiments. Those skilled in the art can understand other advantages and effects of the present invention easily through the disclosure of the description.

Embodiments

The inner side and the outer side are defined with reference to the stockyard and the stockpile. The inner side indicates a position near a middle retaining wall of the stockyard.

Figure 1:
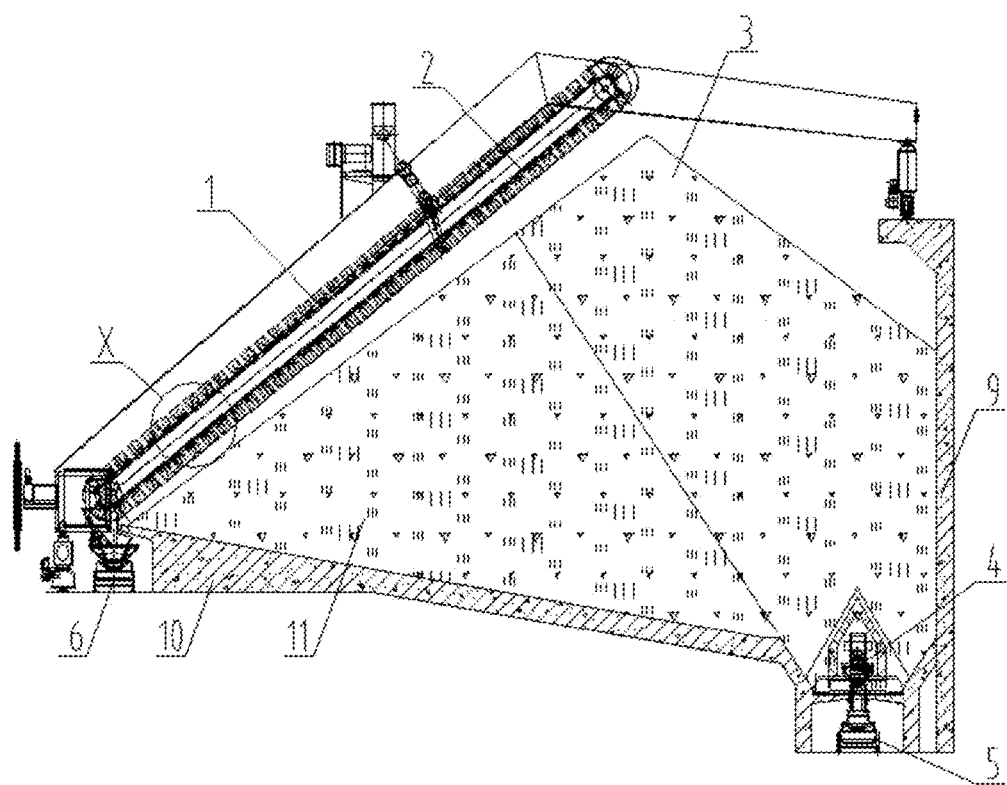
FIG. 1 is a main arrangement view of a high material level in embodiments of the present invention.
Figure 2:
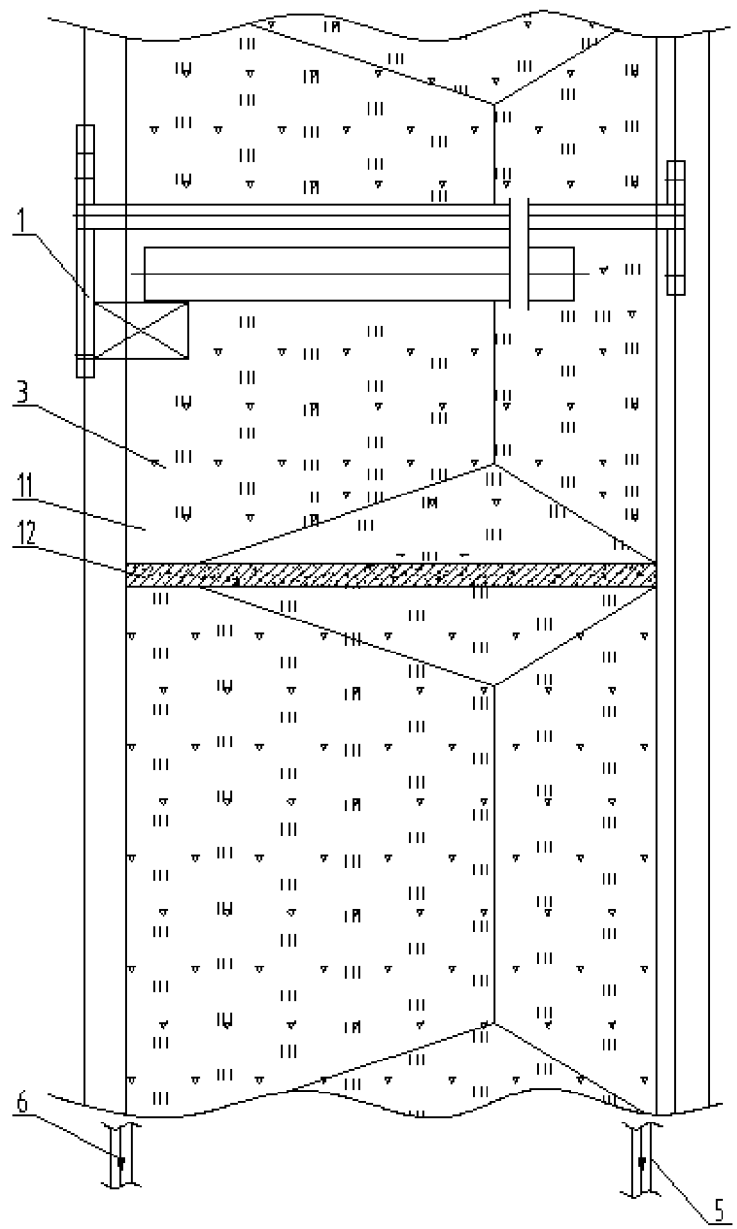
FIG. 2 is an X amplified view of embodiments of the present invention.
Figure 3:
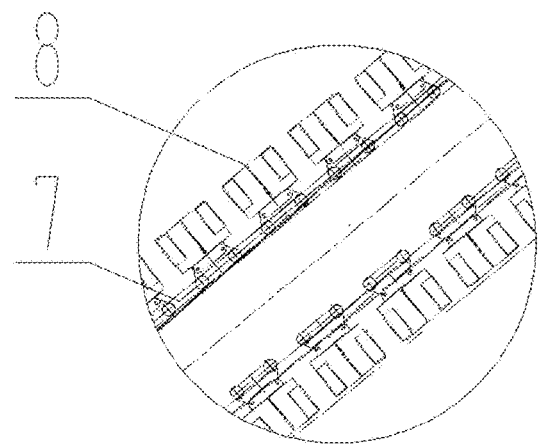
FIG. 3 is an arrangement plan view of embodiments of the present invention.

As shown in FIG. 1 to FIG. 3, a stockyard joint reclaiming system comprises an outer output conveyor 6 and a scraper reclaimer 1 provided with a scraper mechanism 2, wherein the outer output conveyor 6 is located on the outer side of the stockpile 3; the stockyard joint reclaiming system further comprises an inner feeder 4 and an inner output conveyor 5 arranged below the stockpile; and the inner output conveyor 5 is located below the inner feeder 4. Preferably, the inner feeder 4 is arranged below the inner side of the stockpile 3. The scraper mechanism 2 comprises a chain 7 and a scraper 8 installed on the chain 7. The chain 7 moves forwards or backwards under the action of a driving device to drive the scraper 8 to push materials to a corresponding discharging port, wherein the discharging port is divided into an inner side and an outer side respectively corresponding to the outer output conveyor 6 and the inner feeder 4.

The scraper reclaimer 1 is a semi-portal structure, is provided with an upper and a lower travelling tracks, and can move back and forth along a lengthwise direction of the stockyard. The inner feeder 4 is located above the inner output conveyor 5, and can move back and forth along the lengthwise direction of the stockyard. In the present embodiment, the inner output conveyor 5 and the outer output conveyor 6 adopt belt conveyors. Relative to a traditional mode that reclaiming can only be realized at the outer side, the system can realize joint reclaiming at the inner side and the outer side, so that a reclaiming mode is flexible, and more output lines are available. Especially, when the materials 3 are lower than a horizontal position of the scraper reclaimer 1, if scraping is stilled made to the outer side, the materials 3 must be lifted through the scraper 8, causing that idle work is generated and efficiency is low. However, the system can realize reclaiming through the inner feeder 4 and the inner output conveyor 5 in a mode of scraping the material to the inner side by the scraper 8 according to needs of a production technology. A mode of scraping the material to the outer side and reclaiming by lifting the material is not needed, thereby reducing unnecessary energy consumption and effectively enhancing the reclaiming capability of the scraper reclaimer 1.

Of course, the system also comprises a hoisting device or hydraulic flexible device for driving the scraper mechanism 2 of the scraper reclaimer 1 to perform pitching operation. In the present embodiment, the materials are stored in the material storing cabinet 11 and the material storing cabinet 11 is enclosed by a material storing and bearing bottom plate 10 and a vertical retaining wall 9, wherein the inner feeder 4 is located below the stockpile and near the vertical retaining wall 9. The scraper reclaimer 1 is erected on the track arranged on the vertical retaining wall 9 and the track arranged on the outer side of the stockpile. For the convenience of storing different kinds of materials, a plurality of horizontal partition walls 12 are also arranged; the horizontal partition walls 12 divide the material storing cabinet 11 into a plurality of unit material cabinets; and the unit material cabinets can also be used for respectively storing materials needing blending and materials needing not blending. In the present embodiment, FIG. 1 shows a stockyard structure. The system is also suitable for such a stockyard structure that a material storing bin enclosed by retaining walls is formed in the middle of the stockyard and material storing cabinets are formed on both sides of the material storing bin.

Further, the inner feeder 4 is lower than a lowest level of an operation range of the scraper mechanism 2 of the scraper reclaimer 1 in a vertical position, and the inner feeder 4 and the inner output conveyor 5 are located outside the range of the scraper mechanism 2 of the scraper reclaimer 1 in a horizontal position. Through this arrangement, regardless of the height of the level of the materials 3, the scraper mechanism 2 of the scraper reclaimer 1 can push the materials 3 to the inner feeder 4 and the inner output conveyor 5 for reclaiming in a mode of scraping the materials to the inner side through the scraper 8; and the materials in the material storing cabinet 11 are thoroughly taken out.

Further, the inner feeder 4 is also provided with a weighing device. This structure is convenient for quantitatively taking the material by weighing during material blending. The material stored in the stockyard is not required to be transferred to the blending bin for performing proportioning operation, thereby realizing integrated storage and blending.

Another key point of the present invention is that the scraper 8 has a front scraper arranged forwards and a rear scraper arranged backwards to form a bidirectional scraping structure. Thus, the scraper 8 can move forwards or backwards in two directions under the drive of the chain 7, so as to scrape the material forwards or backwards. Thus, the material can realize a mode of reclaiming at the inner side, reclaiming at the outer side or joint reclaiming at the inner side and the outer side. The inner output conveyor or the outer output conveyor takes precedence, depending on actual conditions. For the material variety needing blending, the weighing device arranged on the inner feeder is mainly used for quantitative feeding and the inner output conveyor is used for delivering the material, thereby realizing quantitative feeding. A plurality of inner feeders can be arranged. For the material variety needing not blending, the material can be delivered through the outer output conveyor or through the inner output conveyor and the outer output conveyor jointly.

Specifically, with reference to FIG. 6 to FIG. 10, the scraper 8 comprises an installing plate 86 and two groups of front and rear scraper components oppositely arranged on the installing plate 86; the scraper components comprise main plates 81 and side plates 82 connected on both ends of the main plates 81; and the side plates 82 are obliquely arranged and form a "⌣"-shaped structure with the main plates 81. The side plate 82 of the front scraper component is inclined forwards by a predetermined angle, and the side plate 82 of the rear scraper component is inclined backwards by a predetermined angle.

The scraper components also comprise bottom plates 85 connected to bottom ends of the side plates 82 and the main plates 81. In the structures, the two groups of side plates 82 are respectively inclined forwards or backwards by a certain angle. The angle can be set according to actual demands. The side plates 82 and the main plates 81 are matched with the bottom plates 85 to form an inward concave structure, so as to benefit conveyance of the bulk material 3. Because the structures are in tandem, the structures can adapt to scraping the materials 3 forwards or backwards.

Further, the main plate 81 of the front scraper component and the main plate 81 of the rear scraper component are supported and connected by the rib plates 83, and the rib plates 83 can be arranged along the horizontal direction or the vertical direction. At least two installing plates 86 are also connected between the two main plates 81. The structure relies on the rib plates 83 and the installing plates 86 between the two groups of main plates 81 to perform effective connection to form a whole. The installing plates 86 not only play a role of installing and connecting the front scraper component and the rear scraper component, but also play a role of reinforcing structural strength and stiffness of the bearing part of the entire scraper as a supporting and stressing point of the entire scraper. In addition, connecting holes 88 are also formed in the installing plates 86, so as to connect and install the chain 7 of the reclaimer.

Further, reinforced rib plates 87 are arranged on back surfaces of the side plates 82 for support, so as to increase strength and stiffness of the bearing parts of the side plates 82. In addition, rake teeth 84 are also arranged. The rake teeth 84 protrude from edges of the main plates 81 or the side plates 82 to loosen the materials 3, thereby facilitating scraping and conveyance of the materials 3.

The present invention also provides a stockyard joint reclaiming method, adopting the stockyard joint reclaiming system and used for outputting stored materials, wherein the following reclaiming modes are selected according to the height of the material level or needs of technological production:

the materials 3 are conveyed to the inner output conveyor under the action of own gravity through the operation of the inner feeder 4, and the inner feeder 4 moves back and forth along the lengthwise direction of the stockyard to complete reclaiming in the lengthwise direction;

the scraper reclaimer 1 located on the outer side is operated forwards through the chain 7 of the scraper mechanism 2 to drive the scraper to move for pushing the materials to the outer output conveyor 6, and the scraper reclaimer 1 moves back and forth along the lengthwise direction of the stockyard to complete reclaiming in the lengthwise direction; and the scraper reclaimer 1 located on the outer side is operated backwards through the chain 7 of the scraper mechanism 2 to drive the scraper to move for pushing the materials 3 to the upper part of the inner feeder 4, the materials above the inner feeder 4 are outputted to the inner output conveyor 5 under the action of the gravity through the inner feeder 4, and the inner feeder 4 moves back and forth along the lengthwise direction of the stockyard to complete reclaiming in the lengthwise direction. This reclaiming mode is especially suitable for a lower material level, i.e., the materials are in or below the horizontal position and the scraper mechanism 2 of the scraper reclaimer 1 needs to downwards incline by a certain angle to scrape the materials. The reclaiming mode solves problems of increase of power and large energy consumption because the scraper mechanism 2 needs to downwards incline by a certain angle to lift the materials when the surfaces of the materials are lower than the discharging port.

Specifically:

As shown in FIG. 1, when the materials 3 are at the high material level, i.e., the materials 3 can fall into the discharging port corresponding to the inner feeder 4 through own gravity without using the scraper reclaimer 1, the materials 3 are conveyed to the inner output conveyor 5 under the action of own gravity through the operation of the inner feeder 4, and the inner feeder 4 moves back and forth along the lengthwise direction of the stockyard to complete reclaiming in the lengthwise direction. Or, according to production needs, the scraper reclaimer 1 located on the outer side is operated forwards through the chain 7 of the scraper mechanism 2 to drive the scraper to move for pushing the materials 3 to the outer output conveyor 6, and the scraper reclaimer 1 moves back and forth along the lengthwise direction of the stockyard to complete reclaiming.

Figure 4:
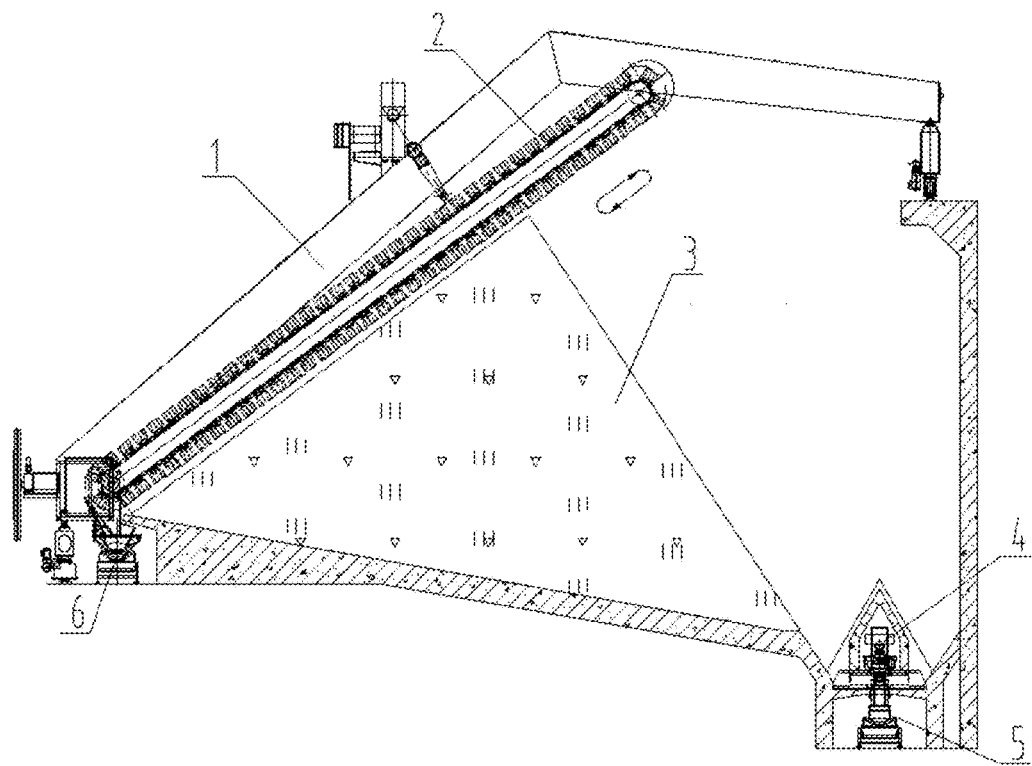
FIG. 4 is a main arrangement view of a material level in embodiments of the present invention.

As shown in FIG. 4, when the materials 3 are at a medium material level, i.e., the materials 3 cannot be outputted through the inner feeder 4 by means of the action of the own gravity due to existence of static bulk angle, the scraper reclaimer 1 located on the outer side is operated forwards through the chain 7 of the scraper mechanism 2 to drive the scraper to move for pushing the materials 3 to the outer output conveyor 6, and the scraper reclaimer 1 moves back and forth along the lengthwise direction of the stockyard to complete reclaiming. Or, the scraper reclaimer 1 is operated backwards through the chain 7 of the scraper mechanism 2 to drive the scraper to move for pushing the materials 3 to the upper part of the inner feeder 4, the materials 3 above the inner feeder 4 are outputted to the inner output conveyor 5 under the action of the gravity through the inner feeder 4, and the scraper reclaimer 1 and the inner feeder 4 move back and forth along the lengthwise direction of the stockyard to complete reclaiming.

Figure 5:
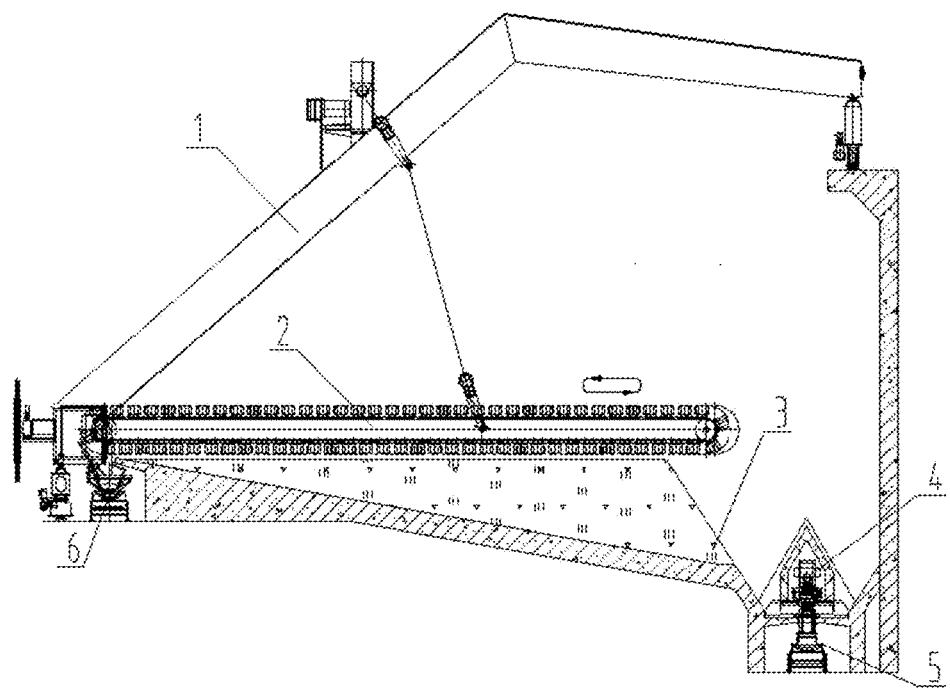
FIG. 5 is a main arrangement view of a low material level in embodiments of the present invention.
Figure 6:
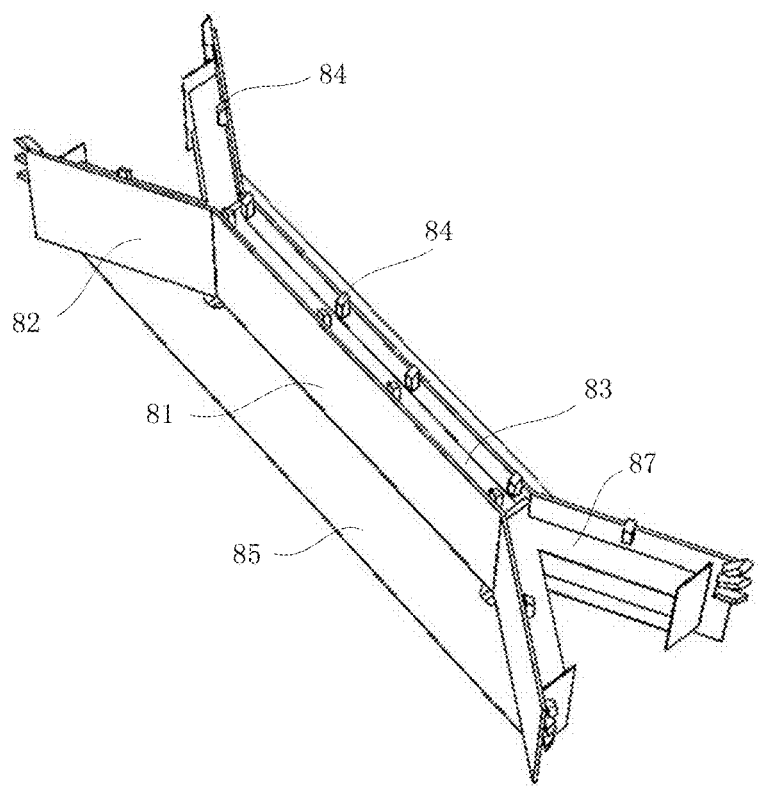
FIG. 6 and FIG. 7 are stereoscopic diagrams of a scraper of the present invention.
Figure 7:
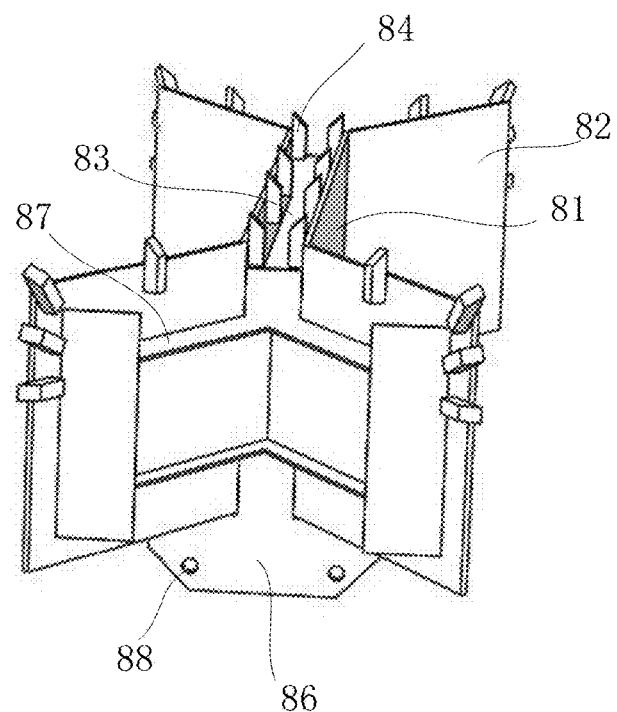
Figure 8:
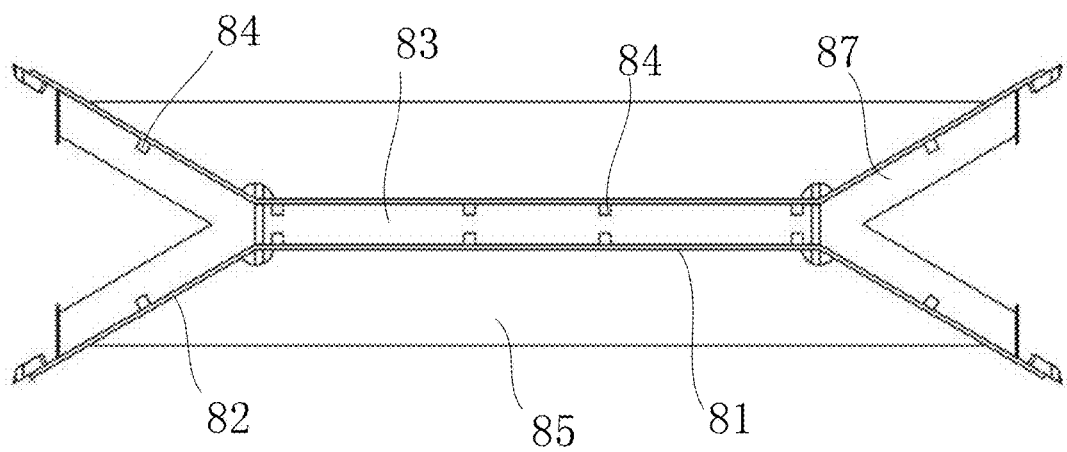
FIG. 8 is a top view of FIG. 6.
Figure 9:
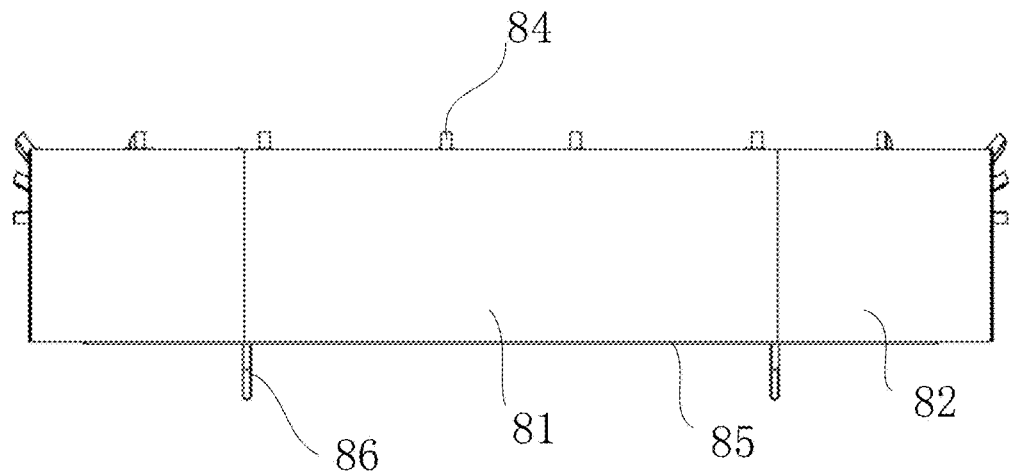
FIG. 9 is a main view of FIG. 6.
Figure 10:
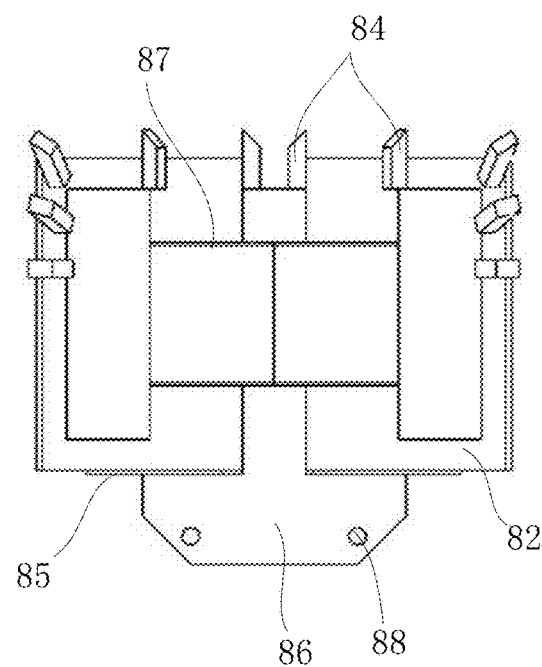
FIG. 10 is a left view of FIG. 6.

As shown in FIG. 5, when the materials 3 are at a low material level, i.e., the scraper mechanism 2 of the scraper reclaimer 1 downwards inclines by a certain angle and is in or below the horizontal position, a mode of reclaiming on the inner side is preferred, i.e., the scraper reclaimer 1 located on the outer side is operated backwards through the chain 7 of the scraper mechanism 2 to drive the scraper to move for pushing the materials 3 to the upper part of the inner feeder 4, the materials 3 above the inner feeder 4 are outputted to the inner output conveyor 5 under the action of the gravity through the inner feeder 4, and the inner feeder 4 moves back and forth along the lengthwise direction of the stockyard to complete reclaiming. The mode of scraping the materials by downwards inclining can avoid lifting the materials, thereby reducing unnecessary energy consumption and guaranteeing the reclaiming capability of the scraper reclaimer. Of course, according to production needs, the scraper reclaimer 1 located on the outer side is operated forwards through the chain 7 of the scraper mechanism 2 to drive the scraper to move for pushing the materials 3 to the outer output conveyor 6, and the scraper reclaimer 1 moves back and forth along the lengthwise direction of the stockyard to complete reclaiming.

The inner output conveyor 5 or the outer output conveyor 6 takes precedence, depending on actual conditions. For the material variety needing blending, the weighing device arranged on the inner feeder 4 is mainly used for quantitative feeding and the inner output conveyor 5 is used for delivering the material, thereby realizing quantitative feeding. A plurality of inner feeders 4 can be arranged. For the material variety needing not blending, the materials 3 can be delivered through the outer output conveyor 6 or through the inner output conveyor and the outer output conveyor 6 jointly.

Any of those skilled in the art can modify or change the above embodiments without deviating from spirits and categories of the present invention. Therefore, all equivalent modifications or changes completed by ordinary intellectuals in the technical field without departing from spirits and technical thoughts revealed in the present invention shall still be covered by claims of the present invention.

What is claimed is:

1. A stockyard joint reclaiming system, comprising:
    an outer output conveyor configured to receive materials from a scraper;
    a scraper reclaimer provided with a scraper mechanism configured to push the scraper forward and backward; and
    an inner feeder and an inner output conveyor arranged below a stockpile and outside of an operation range of the scraper mechanism configured to receive materials from the scraper;
    wherein the scraper mechanism comprises a chain and a scraper installed on the chain;
    wherein the chain moves forwards or backwards to drive the scraper to push materials to a corresponding discharging port; and
    wherein the scraper mechanism is configured to push materials via the scraper through the inner feeder and then to the inner output conveyor, or through the outer output conveyor.

2. The stockyard joint reclaiming system according to claim 1, wherein the inner feeder is lower than a lowest level of an operation range of the scraper mechanism of the scraper reclaimer in a vertical direction, and the inner output conveyor is located below the inner feeder.

3. The stockyard joint reclaiming system according to claim 2, wherein the inner feeder is also configured to weigh the materials.

4. The stockyard joint reclaiming system according to claim 2, wherein the scraper has a front scraper arranged forwards and a rear scraper arranged backwards to form a bidirectional scraping structure.

5. The stockyard joint reclaiming system according to claim 2, wherein:
    the scraper comprises an installing plate and two groups of scraper components oppositely arranged on the installing plate, the installing plate configured to install and connect a front scraper component and a rear scraper component;
    the scraper components comprise main plates and side plates connected on both ends of the main plates, wherein at least two installing plates are disposed between two main plates; and
    the side plates are obliquely arranged and form a "\_/"-shaped structure with the main plates.

6. The stockyard joint reclaiming system according to claim 1, wherein the inner feeder and the inner output conveyor are located outside the operation range of the scraper mechanism of the scraper reclaimer in a horizontal direction.

7. The stockyard joint reclaiming system according to claim 6, wherein the inner feeder is also configured to weigh the materials.

8. The stockyard joint reclaiming system according to claim 6, wherein the scraper has a front scraper arranged forwards and a rear scraper arranged backwards to form a bidirectional scraping structure.

9. The stockyard joint reclaiming system according to claim 6, wherein:
the scraper comprises an installing plate and two groups of scraper components oppositely arranged on the installing plate, the installing plate configured to install and connect a front scraper component and a rear scraper component;
the scraper components comprise main plates and side plates connected on both ends of the main plates, wherein at least two installing plates are disposed between two main plates; and
the side plates are obliquely arranged and form a "\_/"-shaped structure with the main plates.

10. The stockyard joint reclaiming system according to claim 1, wherein the scraper reclaimer and the inner feeder are configured to move back and forth along a lengthwise direction of the stockyard, and a bottom surface of the stockyard is a bevel with a higher outer side and a lower inner side or the bottom surface of the stockyard is a plane.

11. The stockyard joint reclaiming system according to claim 10, wherein the inner feeder is also configured to weigh the materials.

12. The stockyard joint reclaiming system according to claim 10, wherein the scraper has a front scraper arranged forwards and a rear scraper arranged backwards to form a bidirectional scraping structure.

13. The stockyard joint reclaiming system according to claim 10, wherein:
the scraper comprises an installing plate and two groups of scraper components oppositely arranged on the installing plate, the installing plate configured to install and connect a front scraper component and a rear scraper component;
the scraper components comprise main plates and side plates connected on both ends of the main plates, wherein at least two installing plates are disposed between two main plates; and
the side plates are obliquely arranged and form a "\_/"-shaped structure with the main plates.

14. The stockyard joint reclaiming system according to claim 1, wherein the stockyard joint reclaiming system also comprises a material storing and bearing bottom plate and a vertical retaining wall; the material storing and bearing bottom plate and the vertical retaining wall form a material storing cabinet; the material storing cabinet is divided into a plurality of independent unit material cabinets by a horizontal partitioning wall arranged in the material storing cabinet; the inner feeder and the inner output conveyor are located below an inner side of the stockpile, and are near the vertical retaining wall.

15. The stockyard joint reclaiming system according to claim 1, wherein the inner feeder is also configured to weigh the materials.

16. The stockyard joint reclaiming system according to claim 1, wherein the scraper has a front scraper arranged forwards and a rear scraper arranged backwards to form a bidirectional scraping structure.

17. The stockyard joint reclaiming system according to claim 1, wherein:
the scraper comprises an installing plate and two groups of scraper components oppositely arranged on the installing plate, the installing plate configured to install and connect a front scraper component and a rear scraper component;
the scraper components comprise main plates and side plates connected on both ends of the main plates, wherein at least two installing plates are disposed between two main plates; and
the side plates are obliquely arranged and form a "\_/"-shaped structure with the main plates.

18. The stockyard joint reclaiming system according to claim 17, wherein:
two main plates are connected and supported through a rib plate, and reinforced rib plates are arranged on the side plates, configured to connect the side plates and main plates together;
the scraper components also comprise bottom plates connected to bottom ends of the main plates and the side plates, the bottom plates configured to form an inward concave structure with the main plates and side plates;
rake teeth are also arranged on the main plates and the side plates, configured to loosen the materials passing through the system; and
the rake teeth extend from edges of the main plates and the side plates.

19. A stockyard joint reclaiming method, comprising:
conveying materials to an inner output conveyor under the action of gravity through the operation of an inner feeder, and the inner feeder moves back and forth along the lengthwise direction of the stockyard to complete reclaiming in the lengthwise direction;
operating a scraper reclaimer located on an outer side forwards through a chain of a scraper mechanism to drive a scraper to move for pushing the materials to an outer output conveyor, and the scraper reclaimer moves back and forth along the lengthwise direction of the stockyard to complete reclaiming in the lengthwise direction;
operating the scraper reclaimer located on the outer side backwards through the chain of the scraper mechanism to drive the scraper to move for pushing the materials to an upper part of the inner feeder, the materials above the inner feeder are outputted to the inner output conveyor under the action of gravity through the inner feeder, and the inner feeder moves back and forth along the lengthwise direction of the stockyard to complete reclaiming in the lengthwise direction; and
pushing the materials with the scraper via the scraper mechanism into the inner feeder then to the inner output conveyor, or through the outer output conveyor.

* * * * *